US012605725B2

(12) United States Patent
Hackett et al.

(10) Patent No.: US 12,605,725 B2
(45) Date of Patent: Apr. 21, 2026

(54) CONCEALED WINDOW SPRINKLER

(71) Applicant: Tyco Fire Products LP, Cranston, RI (US)

(72) Inventors: Robert Hackett, Cranston, RI (US); Sean E. Cutting, West Warwick, RI (US); Narayana Rayapati, Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 75 days.

(21) Appl. No.: 18/609,777

(22) Filed: Mar. 19, 2024

(65) Prior Publication Data

US 2024/0216932 A1 Jul. 4, 2024

Related U.S. Application Data

(63) Continuation of application No. 17/097,398, filed on Nov. 13, 2020, now Pat. No. 11,964,289, which is a continuation of application No. 16/591,090, filed on Oct. 2, 2019, now Pat. No. 10,843,209.

(51) Int. Cl.

| | |
|---|---|
| ***B05B 1/26*** | (2006.01) |
| ***A62C 31/02*** | (2006.01) |
| ***A62C 37/09*** | (2006.01) |
| ***A62C 37/11*** | (2006.01) |

(52) U.S. Cl.

CPC .............. *B05B 1/267* (2013.01); *A62C 31/02* (2013.01); *A62C 37/09* (2013.01); *A62C 37/11* (2013.01)

(58) Field of Classification Search

CPC .... A62C 37/09–16; A62C 31/02; B05B 1/267
USPC ................................................ 169/37–42, 90
See application file for complete search history.

(56) References Cited

U.S. PATENT DOCUMENTS

| | | | |
|---|---|---|---|
| 1,118,266 | A | 11/1914 | Burhoe |
| 2,076,483 | A | 4/1937 | Rowley |
| 2,778,685 | A | 1/1957 | Umbricht |
| 4,618,002 | A | 10/1986 | Mears |
| 6,098,718 | A | 8/2000 | Sato |
| 6,308,784 | B1 | 10/2001 | Mears |

(Continued)

OTHER PUBLICATIONS

International Search Report and Written Opinion on International Application No. PCT/IB2020/059114, mail date Mar. 11, 2021, 18 pages.

*Primary Examiner* — Cody J Lieuwen
(74) *Attorney, Agent, or Firm* — Foley & Lardner LLP

(57) ABSTRACT

A fire exposure protection sprinkler assembly includes a fluid supply line configured to provide fire exposure protection fluid and a fire exposure protection sprinkler. The fire exposure protection sprinkler includes a body coupled to the fluid supply line and configured to receive the fire exposure protection fluid, a sealing assembly configured to unseal in response to a fire such that fire exposure protection fluid may flow, a housing having a pair of legs arranged opposite the housing of each other and having an aperture, and a deflection assembly having a pair of guide pins coupled to a deflector and the housing and disposed within each of the apertures of the legs, wherein the deflection assembly is configured to extend from the housing, wherein the deflection assembly is configured to receive the flow of the fire exposure protection fluid while extending from the housing.

20 Claims, 7 Drawing Sheets

(56) References Cited

U.S. PATENT DOCUMENTS

| | | | | |
|---|---|---|---|---|
| 2002/0056763 | A1* | 5/2002 | Winebrenner .......... | B05B 1/267<br>239/524 |
| 2006/0086510 | A1* | 4/2006 | Pahila .................... | A62C 37/14<br>169/42 |
| 2008/0277125 | A1 | 11/2008 | Wilkins et al. | |
| 2009/0255693 | A1 | 10/2009 | Sato et al. | |
| 2011/0180277 | A1* | 7/2011 | Jimenez ................. | A62C 37/11<br>169/37 |
| 2013/0219613 | A1 | 8/2013 | Ojea | |
| 2014/0262356 | A1* | 9/2014 | Ringer ................... | A62C 35/62<br>169/37 |
| 2017/0296852 | A1* | 10/2017 | Pipe ....................... | A62C 37/09 |
| 2017/0319884 | A1* | 11/2017 | Oldham ................. | A62C 37/12 |
| 2020/0346061 | A1* | 11/2020 | Meyer .................... | A62C 37/09 |

* cited by examiner

CONCEALED WINDOW SPRINKLER

CROSS-REFERENCE TO RELATED APPLICATIONS

The present application is a continuation of U.S. patent application Ser. No. 17/097,398, filed Nov. 13, 2020, which is a continuation of U.S. patent application Ser. No. 16/591,090, filed Oct. 2, 2019, the disclosures of which are incorporated herein by reference in their entireties.

BACKGROUND

Buildings and other areas commonly include sprinklers configured to provide fire exposure protection. In the event of a fire, the sprinklers are configured to dispense a fluid so as to suppress or extinguish the fire or to protect building elements from exposure to heat radiating from the fire.

SUMMARY

At least one aspect of the present disclosure is a fire exposure protection sprinkler assembly configured to provide fire exposure protection for an area. The fire exposure protection sprinkler assembly includes a fluid supply line configured to provide fire exposure protection fluid to the fire exposure protection sprinkler assembly, and a fire exposure protection sprinkler including a body coupled to the fluid supply line and configured to receive the fire exposure protection fluid, a sealing assembly configured to unseal in response to a fire such that fire exposure protection fluid may flow from the fluid supply line to the fire exposure protection sprinkler assembly, and a housing including a pair of legs arranged opposite the housing of each other, with each of the legs having an aperture. The fire exposure protection sprinkler assembly also includes a deflection assembly including a pair of guide pins rigidly coupled to a deflector, with each of the guide pins slidably coupled to the housing and disposed within each of the apertures of the legs, wherein the deflection assembly is configured to extend from the housing, wherein, upon the deflection assembly receiving the flow of the fire exposure protection fluid and extending from the housing, the pair of guide pins are arranged at a first oblique angle relative to a horizontal axis and the deflector is arranged at a second oblique angle relative to a vertical axis.

Another aspect of the present disclosure includes the first oblique angle relative to the horizontal axis being equal to the second oblique angle relative to the vertical axis.

Another aspect of the present disclosure includes the first oblique angle relative to the horizontal axis being of a different measure than the second oblique angle relative to the vertical axis.

Another aspect of the present disclosure includes the deflector having a first surface configured to receive the fire exposure protection fluid from the fluid supply line, and a back wall adjacent the first surface, with the first surface extending from a base of the back wall, wherein the back wall is configured to direct the fire exposure protection fluid to the area.

Another aspect of the present disclosure includes the deflection assembly configured to extend below the ceiling upon the first surface of the deflector receiving the flow of the fire exposure protection fluid.

Another aspect of the present disclosure includes the deflection assembly configured to extend below the ceiling upon the release of a cover plate configured to cover the recess.

Another aspect of the present disclosure includes each of the guide pins having a substantially cylindrical geometry and the apertures of the housing have a geometry configured to accommodate and permit movement of the each of the guide pins.

Another aspect of the present disclosure includes each of the guide pins having a head configured opposite the guide pins from the deflector, wherein the head of each of the guide pins has a diameter greater than the diameter of the apertures of the housing.

Another aspect of the present disclosure includes the deflector having a pair of arms extending laterally from opposite sides of the deflector.

Another aspect of the present disclosure includes a baffle configured to surround at least a portion of the deflector.

Another aspect of the present disclosure includes the body having a hexagonal portion coupled to the housing, wherein the housing is coupled to the hexagonal portion of the body such that each of the apertures of the legs of the housing have a footprint on the hexagonal portion adjacent opposite sides of the hexagonal portion.

At least one aspect of the present disclosure is a fire exposure protection sprinkler assembly configured to provide fire exposure protection for an area. The fire exposure protection sprinkler assembly includes a fluid supply line configured to provide fire exposure protection fluid to the fire exposure protection sprinkler assembly and a fire exposure protection sprinkler. The fire exposure protection sprinkler includes a body coupled to the fluid supply line and configured to receive the fire exposure protection fluid, a sealing assembly configured to unseal in response to a fire such that fire exposure protection fluid may flow from the fluid supply line to the fire exposure protection sprinkler assembly, a housing having a pair of legs each of the legs having an aperture, and a deflection assembly including a pair of guide pins rigidly coupled to a deflector, with each of the guide pins slidably coupled to the housing and disposed within each of the apertures of the legs, wherein the deflection assembly is configured to extend from the housing upon the deflector receiving a flow of the fire exposure protection fluid from the fluid supply line, wherein at least a portion of the deflection assembly is surrounded by a baffle.

Another aspect of the present disclosure includes the baffle having one or more vents configured to permit airflow therethrough.

Another aspect of the present disclosure includes the deflector having a first surface configured to receive the fire exposure protection fluid from the fluid supply line, and a back wall adjacent the first surface, with the first surface extending from a base of the back wall, wherein the back wall is configured to direct the fire exposure protection fluid to the area.

Another aspect of the present disclosure includes the deflection assembly configured to extend below the ceiling upon the first surface of the deflector receiving the flow of the fire exposure protection fluid.

Another aspect of the present disclosure includes the deflection assembly configured to extend below the ceiling upon the release of a cover plate configured to cover the recess.

Another aspect of the present disclosure includes each of the guide pins having a substantially cylindrical geometry and the apertures of the housing having a geometry configured to accommodate and permit movement of the each of the guide pins.

Another aspect of the present disclosure includes each of the guide pins having a head configured opposite the guide pins from the deflector, wherein the head of each of the guide pins has a diameter greater than the diameter of the apertures of the housing.

Another aspect of the present disclosure includes the deflector comprises a pair of arms extending laterally from opposite sides of the deflector.

At least one aspect of the present disclosure is a fire exposure protection sprinkler including a body coupled to a fluid supply line and configured to receive fire exposure protection fluid, a sealing assembly configured to unseal in response to a fire such that fire exposure protection fluid may flow from the fluid supply line to the fire exposure protection sprinkler, a housing including a pair of legs, each of the legs having an aperture, a deflection assembly having a pair of guide pins rigidly coupled to a deflector, with each of the guide pins slidably coupled to the housing and disposed within each of the apertures of the legs, wherein the deflection assembly is configured to extend from the housing upon the deflector receiving a flow of the fire exposure protection fluid from the fluid supply line, and a baffle configured to surround at least a portion of the deflector and the deflection assembly.

DETAILED DESCRIPTION

Figure 1:
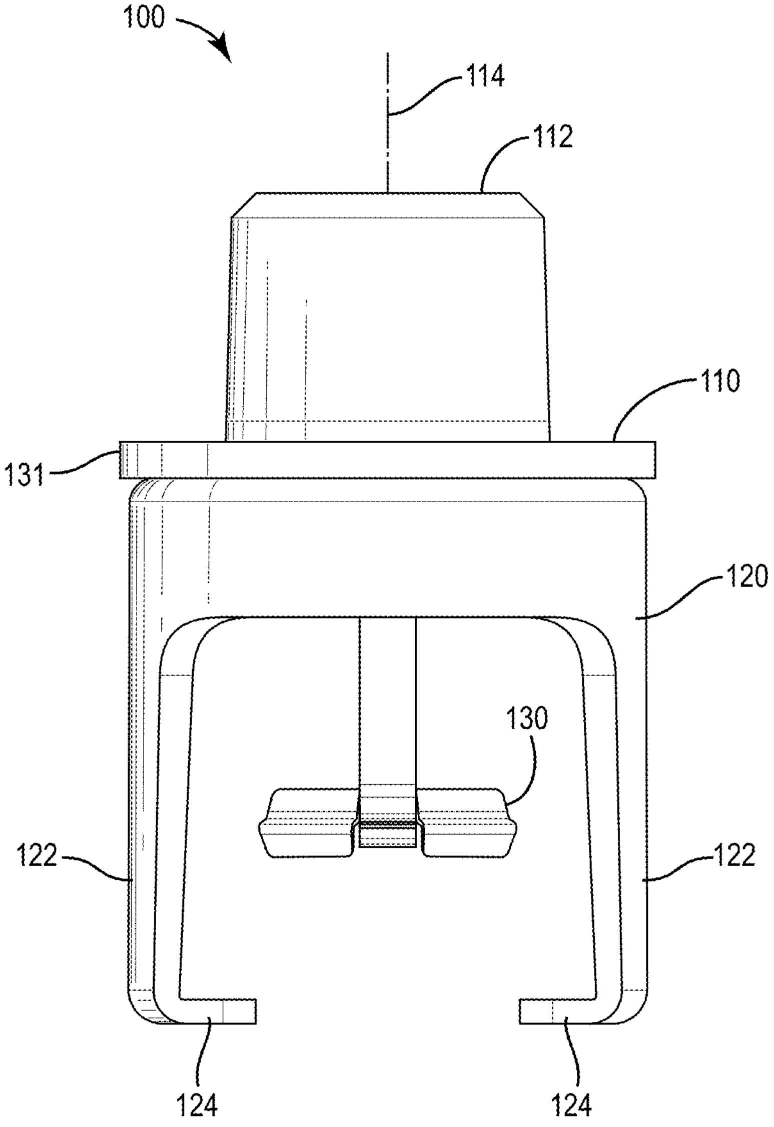
FIG. 1 is a perspective view of a portion of a window sprinkler assembly, according to an example implementation.

Before turning to the figures, which illustrate certain examples, it is noted that the present disclosure is not limited to the details or methodology set forth in the description or illustrated in the figures. The terminology used herein is for the purpose of description only and should not be regarded as limiting.

The present disclosure generally refers to a fire sprinkler. The present disclosure refers to a concealed fire sprinkler configured to disperse water from a sprinkler over a desired area.

Referring generally to the figures, fire exposure protection systems include sprinklers which are configured to inhibit or permit flow of fluid (typically water, but also in some applications fire suppressant fluid) depending upon conditions. In the instance of a fire or detected conditions that may be indicative of a fire (e.g., increased heat, smoke, etc.), the sprinklers are configured to permit the flow of fluid such that the fluid may contact a deflector and be dispersed so as to provide exposure protection to a window and/or wall. In some aspects, the sprinklers may be configured to disperse water or fire exposure protection fluid over a specific area, for example a window and/or wall. In order to accomplish fire exposure protection for a given area (e.g., a window and/or wall), sprinklers can include components configured to direct and deflect fire exposure protection fluid accordingly. For example, if a sprinkler were configured to provide fire exposure protection for a window, then the sprinkler may include components configured to deflect fire exposure protection fluid 1800 over the given window surface.

In some aspects, concealed sprinklers are configured to discharge and deflect a fluid over a desired area, which may include a window and/or wall. In the instance of a window, the implementation of one or more concealed sprinklers allows for use of a less expensive window with a lower fire rating, and can ultimately lower costs for construction as well as replacement or installation of windows. Various different concealed sprinklers may be configured to direct fluid in different directions through various means. Additionally, concealed sprinklers are often implemented in near proximity one another. In order for adjacent concealed sprinklers to function properly, it is critical that fluid only be deflected over the desired area (e.g., the desired window and/or wall) as errant fluid spray (also known as fluid impingement) may cause adjacent sprinklers to malfunction or not function. Accordingly, concealed sprinklers often implement components configured to deflect fluid spray to a desired area (e.g., window and/or wall) as well as components to contain any errant fluid spray and prevent fluid impingement on adjacent sprinklers.

Referring now to FIGS. 1-4, an example of a concealed sprinkler assembly 100 is shown. In some aspects, the concealed sprinkler assembly 100 may be include additional components, such as those shown in FIGS. 3-4, with said additional components configured to accommodate both inactivated and deployed positions of the concealed sprinkler assembly 100, with actuation of the concealed sprinkler assembly 100 from the inactivated position to the deployed position corresponding to the detection and/or identification of a fire or other circumstances, according to some aspects. The deployed position of the concealed sprinkler assembly 100 is configured such that components of the concealed sprinkler assembly 100 may permit and direct the flow of a fire exposure protection fluid and/or a fire suppression fluid over a specific window and/or wall. The inactivated position may correspond to the disposition of the concealed sprinkler assembly 100 within a recess of a wall, ceiling, or other structure. In some aspects, the concealed sprinkler assembly 100 may be further concealed within a recess of a wall or ceiling by a plate or other component configured to cover the recess. When the concealed sprinkler assembly 100 is activated, a plate covering the recess in which the concealed sprinkler assembly 100 is displaced and one or more components of the concealed sprinkler assembly are configured to deploy below the recess. For example, a plate covering the recess may be configured to decouple from the ceiling in response to an environment reaching or exceeding a temperature threshold or upon detection of smoke. Then, a sealing assembly is displaced and fluid flow is permitted from the fluid supply line to the concealed sprinkler assembly 100 and components thereof. As fluid flows from a fluid supply line (not shown in figures) to the concealed sprinkler assembly 100, the fluid contacts the one or more components extending from the recess, with the fluid being deflected in a desired direction (or over a desired range/area) in order to provide fire exposure protection for a given window and/or wall. However, in some aspects the deployment of one or more components may be driven by a flow of fire exposure protection fluid. For example, the components configured to extend from the recess may deploy from a retracted position to an extended position upon receiving fluid flow from the fluid supply line. Further to this example, the transition of the components from the retracted position to the extended position may displace a cap or covering of the recess, thus allowing for the components to extend below the recess.

In some aspects, the activation of the concealed sprinkler assembly 100 may include a fire or other circumstances causing components within or adjacent the concealed sprinkler assembly 100 to initiate the activation process. For example, a fire within a given area may cause a cover to the recess housing the concealed sprinkler assembly 100 to be displaced, followed by one or more components of the concealed sprinkler assembly to deploy ad extend from the recess. The displacement of the cover of the recess may correspond to an increase in temperature within a given area (e.g., from a fire), or from a Subsequently, a fire may cause a sealing assembly to break or rupture (e.g., a link melting), thus initiating the flow of a fluid from a fluid supply line and to the concealed sprinkler assembly 100. Accordingly, the flow of the fluid may contact one or more components of the concealed sprinkler assembly 100 deployed below the recess.

The concealed sprinkler assembly 100 is shown to include a body 110. The body 110 defines an opening 112 configured concentrically about the central axis 114. In some aspects, the opening 112 may be of a cylindrical geometry, and may extend into and/or through the body 110 along the central axis 114. The opening 112 of the body 110 may be configured to receive fluid from a fluid supply line, according to some aspects. The body 110 may also be configured to couple with a fluid supply line or other supply means such that fluid may reach the concealed sprinkler assembly 100. The body 110 may also have various geometries according to some aspects, with the various geometries configured such that the body, and subsequently the concealed sprinkler assembly 100 may be accommodated by various recesses. For example, the opening 112 of the body 110 may be configured in different sizes or geometries so as to accommodate various fire exposure protection fluid flow or coupling to various fluid supply lines depending on space constraints within a recess or other concealed space.

Figure 2:
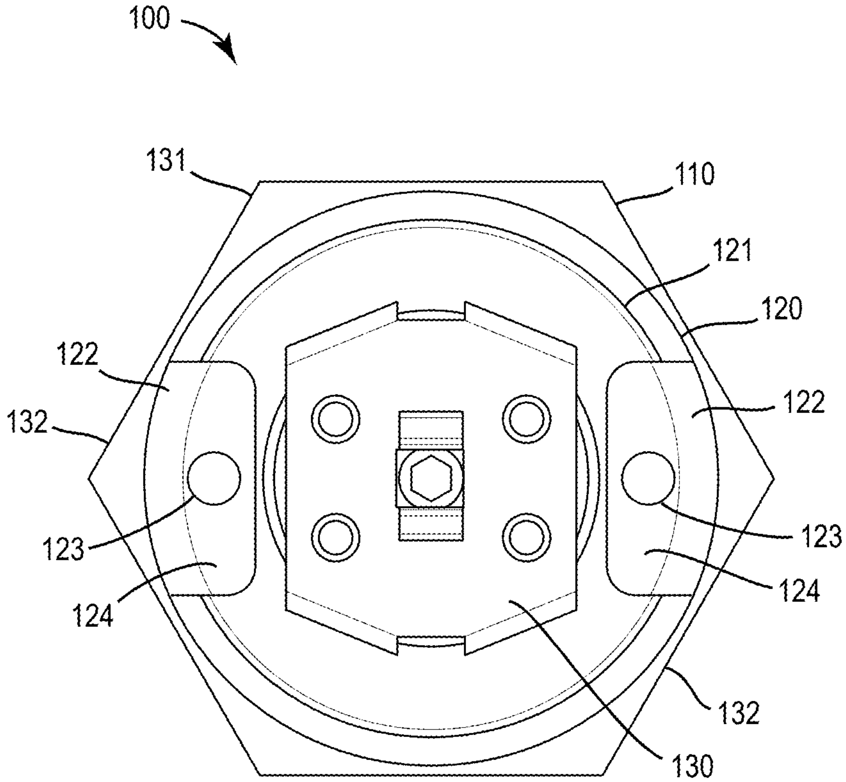
FIG. 2 is a bottom view of the portion of the window sprinkler assembly of FIG. 1, according to an example implementation.
Figure 3:
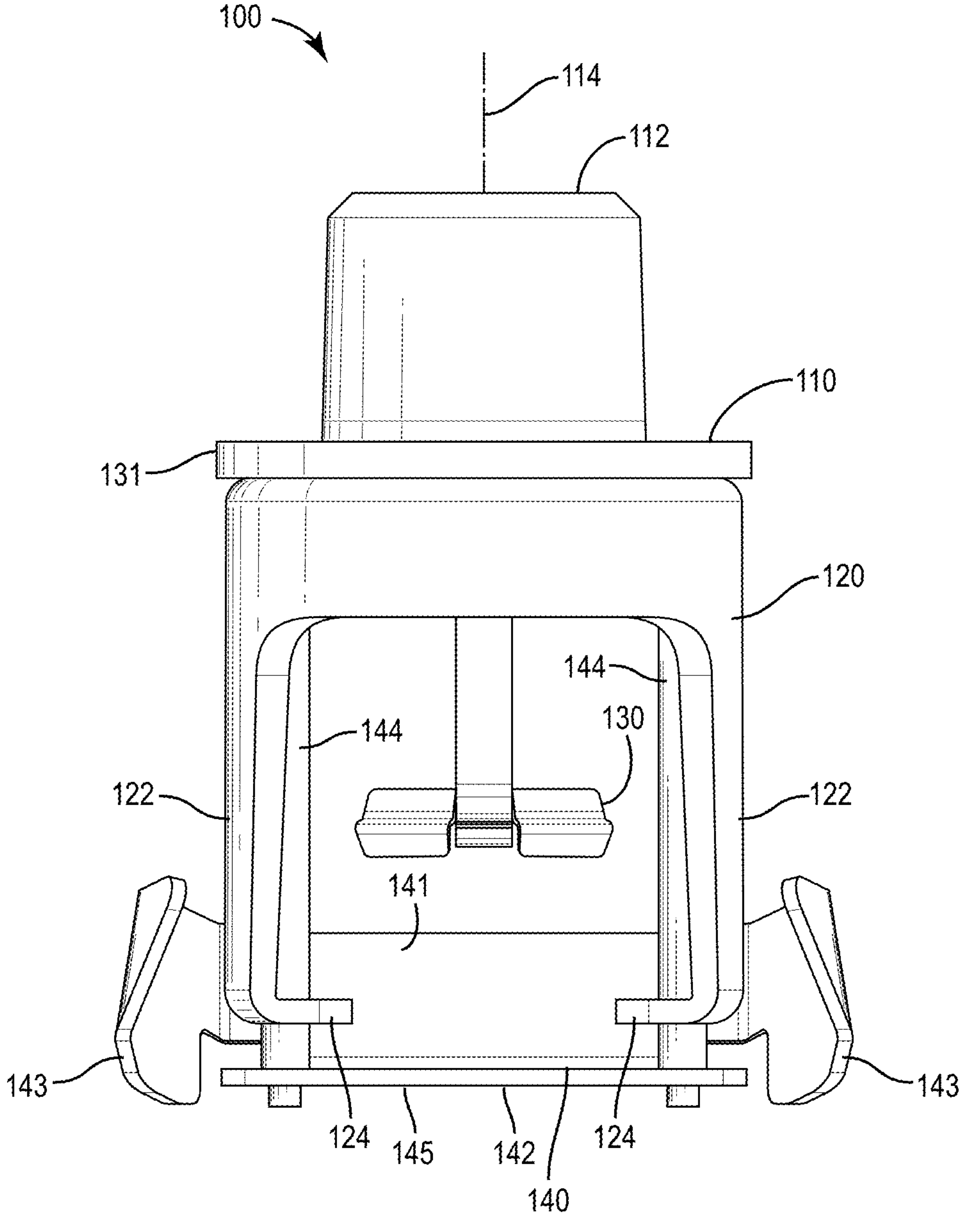
FIG. 3 is a perspective view of the window sprinkler assembly of FIG. 1 including guide pins and a deflector, according to an example implementation.

The body 110 is further shown to include a sealing assembly 130, as shown in FIGS. 1-3. In some aspects, the sealing assembly 130 may include a portion of the body 110, and may also include other components coupled to said portion of the body 110. For example, in some aspects the sealing assembly 130 may include one or more of a spring, a button, a set screw, and levers. In some aspects, such components may be configured at least partially within the opening of the concealed sprinkler assembly 100. Additionally, the sealing assembly 130 may be configured to have a geometry that may be accommodated by components of the concealed sprinkler assembly 100 and/or the recess in which the concealed sprinkler assembly 100 is configured. For example, the sealing assembly 130 may be configured such that it is contained within the footprint of the body 110 so as to maximize spatial efficiency of the recess and the concealed sprinkler assembly 100 thereof. Following the displacement of a cover to the recess and the deployment of one or more components of the concealed sprinkler assembly below the recess, the sealing assembly may restrict or permit the flow of fire exposure protection fluid. The sealing assembly 130 can be configured to permit the flow of fire exposure protection fluid upon the unsealing or rupture of the sealing assembly 130, which may be caused by heat from a fire. For example, upon the sealing assembly 130 becoming unsealed by way of rupture, melting, or other possible processes, fluid may begin to flow from the fluid supply line and thus contact a portion of the concealed sprinkler assembly 100 deployed beyond the recess thus directing the fluid to a desired window and/or wall.

The body 110 is shown to be coupled to a housing 120, with an upper portion of the housing 120 coupled to a lower portion of the body 110 (the lower portion of the body 110 being opposite the body 110 from the portion that can be configured to couple with a fluid supply line or other components). The housing 120 is configured to have an opening 121 such that at least a portion of the body 110 may extend into and/or through the opening 121 of the housing 120. For example, in some aspects, a portion of the body 110 may include components of the sealing assembly 130, and as mentioned previously may be configured within the footprint of the body 110 (e.g., as the sealing assembly 130 is shown in FIGS. 1-3) which may be configured within the opening 121 of the housing 120. Additionally, in some aspects the sealing assembly 130 may be configured to decouple from the concealed sprinkler assembly 100 such that the sealing assembly 130 is decoupled from the body 110. The concealed sprinkler assembly, already in a deployed position with any plate configured to cover the recess displaced, may then begin to deflect and disperse fluid so as to provide fire exposure protection to a window and/or wall.

The housing 120 is shown to include a pair of legs 122 extending in a direction opposite that of the housing 120 that is engaged to couple with the body 110. As shown and described, the legs 122 are configured substantially opposite the housing 120 and the opening 121 from one another (e.g., 180° opposite the housing one another). However, in some aspects the legs 122 may be configured alternatively such that the concealed sprinkler assembly 100 may have a size and geometry compatible with a recess or other concealed space. Each of the legs 122 is shown to have a foot 124 (also referred to as feet 124) with one foot 124 arranged at the proximal end of each leg 122. The feet 124 are configured substantially perpendicular to the legs 122, with the feet 124 extending toward the central axis 114 of the concealed sprinkler assembly 100 (e.g., the feet extend substantially toward the opposite leg 122 and foot 124). In some aspects, the feet 124 and the legs 122 from which the feet 124 extend may have alternate configurations and/or geometries. For example, the feet 124 may be configured such that fluid dispensed by the concealed sprinkler assembly 100 does not contact the legs 122 or the feet 124. Additionally, the legs 122 and the feet 124 may be sized and have geometries configured so as to accommodate and function cooperatively with additional components of the concealed sprinkler assembly 100 as shown and subsequently described.

Each of the feet 124 are shown to include an aperture 123, with the aperture 123 configured in a substantially central portion of the feet 124. The apertures 123 of the feet 124 are shown to have a substantially circular geometry, but may also have alternative geometries in some examples. The apertures 123 are shown to retain guide pins 144, with each aperture 123 configured to retain one guide pin 144. The apertures 123 and guide pins 144 are sized such that linear movement of the guide pins 144 is permitted within the apertures 123, with the linear movement such that the guide pins 144 extend substantially straight as movement of the guide pins 144 occurs while retained by the apertures 123.

As described previously, movement of the guide pins 144 within the apertures 123 may be driven by activation of the concealed sprinkler assembly 100 (following the displacement of any cover of the recess) or due to gravity. Such activation of the concealed sprinkler assembly 100 may include a mechanical release in which components are decoupled such that movement of the guide pins 144 is permitted within the apertures 123, followed by components of the concealed sprinkler assembly 100 contacted by a flow of fire exposure protection fluid after decoupling of the sealing assembly 130. In some aspects, the length and thickness of the guide pins 144 may vary according to various aspects of the concealed sprinkler assembly 100 and the recess in which the concealed sprinkler assembly 100 is disposed, such as longer guide pins 144 implemented for a deeper recess. Additionally, in some aspects the apertures 123 may have alternate geometries, for example elliptical, and may also be pitched to as to angle the guide pins 144 at an oblique angle to the central axis 114. The apertures 123 may also be sized so as to permit movement of the guide pins 144 within the apertures 123, for example to pitch the guide pins 144 so as to form an oblique angle with the central axis 114.

Each of the guide pins 144 can include a head (not shown), with the head having a size and geometry such that movement of the head through the apertures 123 is not mechanically permitted. Accordingly, each of the guide pins 144 is retained within the each of the apertures 123 thus preventing dissociation from the housing 120 of the concealed sprinkler assembly 100. In some aspects, the head of the guide pins 144 is configured such that the head has a greater diameter (or other geometry with a greater width that than of the apertures 123) than other portions of the guide pins 144 that of a size that movement thereof is permitted within the apertures 123. Accordingly, the head of each of the guide pins 144 can define the deployed position of the concealed sprinkler assembly 100, which includes the guide pins 144 extending from the apertures 123 as far as mechanically permitted. Although not shown, the deployed position is thus defined as the guide pins 144 positioned such that the head of each of the guide pins 144 contacts the feet 124 of the legs 122 of the housing 120 such that no further movement of the guide pins 144 in the direction opposite the body 110 is permitted. The guide pins 144 are coupled to a deflector 142 as shown in FIGS. 1-4.

Figure 4:
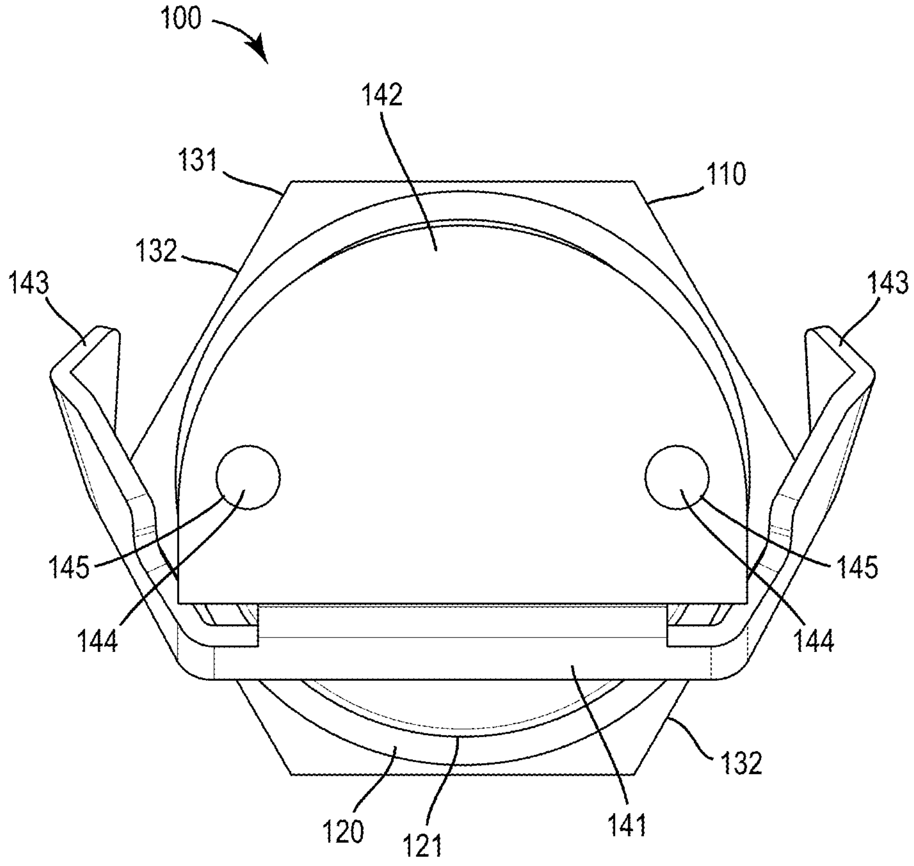
FIG. 4 is a bottom view of the window sprinkler assembly including guide pins and the deflector as shown in FIG. 3, according to an example implementation.

The deflector 142 is coupled to each of the guide pins 144. As shown in FIGS. 3-4, the deflector includes a pair of apertures 145, with each of the apertures 145 configured to receive a portion of each guide pin 144 opposite the head of the guide pin. The guide pins 144 may be coupled to the deflector 142 through a variety of mechanisms and/or means including, for example, welding, riveting, or other coupling means. In some aspects, the guide pins 144 and the deflector 142 may be a single component manufactured such that coupling of the guide pins 144 to the deflector 142 is not required. In some aspects, a portion of the guide pins 144 may protrude from the pair of apertures 145, as shown in FIG. 3. In some aspects, the inactivated position of the concealed sprinkler assembly 100 includes the deflector 142 arranged such that contact between the deflector 142 and the feet 124 of the housing 120 prevents further movement of the guide pins 144 within the apertures 123 toward the body 110. In some aspects, the inactivated position includes a head 146 of the guide pins 144 contacting a portion of the body 110 thus preventing further upward movement of the deflector 142 toward the body 110.

Upon activation of the concealed sprinkler assembly 100, the deflector 142 is configured to transition from the retracted state of the inactivated position (as shown in FIGS. 3-4) to the extended position of the deployed position (not shown) with such transition facilitated by movement of the guide pins 144 within the apertures 123. The transition from the inactivated position to the deployed position further includes the deflector 142 moving in a direction opposite the body 110 as the guide pins 144 move within the apertures 123 until the head of each of the guide pins 144 contacts the feet 124 thus defining the deployed position of the concealed sprinkler assembly 100. As described previously, movement of the deflector 142 in the direction opposite the body 110 following activation of the concealed sprinkler assembly 100 may be driven by a mechanical release or decoupling. The deployment of the deflector below the recess may be followed by a flow of a fluid (e.g., fire exposure protection or suppression fluid flowing from a fluid supply line) contacting the deflector 142 in the deployed position and continuing to contact the deflector 142 in order to provide fire exposure protection to a window and/or wall. In some aspects, the deployment of the deflector 142 and the guide pins 144 below the recess may be driven by a flow of fluid permitted following the decoupling of the sealing assembly 130. In some aspects, the deflector 142 may be deployed such that the guide pins 144 form an oblique angle with the central axis 114, thus pitching the deflector 142 in a downward direction. Accordingly, such an arrangement of the guide pins 144 and the deflector 142 can be advantageous as the deflector 142 may disperse fluid over a greater area (e.g., a bigger window or windows) in such an arrangement.

In the deployed position, the deflector 142 is configured to extend from the recess in which the concealed sprinkler assembly 100 is configured. For example, if the concealed sprinkler assembly 100 is configured within a recess in a ceiling, the deployed position includes the deflector extending from the concealed sprinkler assembly 100 within the recess below the surface of the ceiling. Accordingly, upon activation of the concealed sprinkler assembly 100 (e.g., following displacement of the cover of the recess), the sealing assembly 130 is configured to unseal (for example, decouple or rupture) such that the flow of fluid from the fluid supply line is permitted. The flow of the fluid is configured to proceed substantially along the central axis 114. For example, if the concealed sprinkler assembly 100 is configured vertically within a recess of a ceiling, the unsealing of the sealing assembly 130 would permit the flow of fluid in a substantially vertical direction moving from the body 110 (with the body 110 and/or the opening 112 thereof coupled to and/or otherwise accommodating the fluid supply line) toward the deflector 142 deployed below the concealed sprinkler assembly 100 and extending from the recess. The deflector 142 is configured to continuously receive the flow of fluid and disperse said fluid over a desired window and/or wall corresponding with the geometry of the deflector 142.

The flow of fluid along the central axis 114 is configured to contact the deflector 142, with the origin of the flow within the recess (e.g., the coupling point of the concealed sprinkler assembly 100 with the fluid supply line) and the flow proceeding along the central axis 114 from within the recess to beyond the recess, where the flow contacts the top surface of the deflector 142. The flow of the fluid, upon contact with the deflector 142, is dispersed so as to provide fire exposure protection for a desired window and/or wall. The dispersal of the fluid by the deflector 142 is dependent upon the pressure and velocity of the flow of the fluid as well as the geometry of the deflector 142. Generally, the deflector 142 is configured at an oblique angle (e.g., in some aspects, approximately 74° relative to the central axis 114 (and the direction of the flow of the fluid). Additionally, in some aspects the guide pins 144 may form an oblique angle with the central axis 114. For example, the flow of fluid contacting the deflector 142 may manipulate the deflector (and accordingly the guide pins) such that the guide pins for the oblique angle with the central axis 114. Additionally, in some aspects the guide pins 144 and/or the deflector 142 may have a geometry or other structure (e.g., a weighted portion) configured to manipulate the guide pins 144 such that an oblique angle is formed with the central axis 114. The geometry of the deflector 142 determines the dispersal of the fluid for a given window and/or wall. For example, in some aspects the deflector 142 may be configured to deflect and ultimately disperse the fluid to a window and/or wall. In such an example, the window and/or wall is not within the footprint of the recess accommodating the concealed sprinkler assembly 100, and thus direct flow of fluid from the concealed sprinkler assembly 100 within the recess would not be dispersed to the window and/or wall without deflection via the deflector 142.

The deflector 142 may have various geometries in order to provide fire exposure protection (via dispersal of fire exposure protection fluid) to different windows and/or walls. For example, the deflector may include one or more surfaces that are substantially flat and form approximately 90° angles with various surfaces and/or walls of the deflector 142. Such angles may be configured to prevent fluid from being dispersed in various directions, with the dispersal of the fluid contained across a smaller area. Conversely, in some aspects the deflector 142 is not substantially flat as that of the deflector 142 of FIGS. 3-4. The deflector 142 may include one or more surfaces having curved geometry and/or topography so as to direct the flow of fluid from the fluid supply line to a specific area. In some aspects, various geometries/topographies may correspond to various desired deflection (and subsequent distribution of fluid) patters, and can be implemented accordingly.

The body 110 is shown to have a hexagonal portion 131, with the hexagonal portion 131 of the body 110 contacting the housing 120 in the coupling between the housing 120 and the body 110. As shown in FIGS. 2 and 4, the hexagonal portion 131 of the body 110 includes a pair of flats 132 configured opposite the hexagonal portion 131 from one another. In some aspects, the pair of flats 132 may be alternate flats of the hexagonal portion 131, so long as the pair of flats 132 are configured opposite the hexagonal portion 131 from one another.

As shown in FIGS. 2 and 4, the footprint of the housing 120 and the opening 121 thereof are configured within the hexagonal portion 131. Upon coupling of the housing 120 and the body 110, the footprint of the housing 120 (and any components thereof, such as the pair of legs 122) is configured within the footprint of the body 110 (and the hexagonal portion 131 thereof). With reference to FIG. 2, the apertures 123 of the housing are configured to have a footprint adjacent each of the pair of flats 132, with each of the apertures 123 disposed adjacent an approximate midpoint of each of the flats 132. Such disposition of the housing 120 relative to the hexagonal portion 131 of the housing 120 ensures that, as shown in FIG. 4, two corners of the hexagonal portion 131 of the body 110 may be accessed for various installation practices.

For example, in some aspects a specific tool may be implements in order to install the concealed sprinkler assembly 100 within a recess of a given wall or ceiling. In some aspects, the hexagonal geometry of the hexagonal portion 131 of the body 110 may be configured to interface with a corresponding geometry of one or more installation tools. Various configurations of the housing 120 about the hexagonal portion 131 of the body 110 may be necessary in order to ensure proper interfacing between and tools or instruments and the concealed sprinkler assembly 100. In order to complete necessary installation steps, a tool may be required to manipulate the concealed sprinkler assembly 100. Such a tool may require a specific interface with the concealed sprinkler assembly 100, for example two corners of the hexagonal portion 131 of the body 110. As shown in the example of FIGS. 2 and 4, the arrangement of the housing 120 (and, in FIG. 4, the deflector 142) allows for accessibility to two corners of the hexagonal portion 131 of the concealed sprinkler assembly 100 (e.g., the apertures 123 are disposed adjacent opposite corners of the hexagonal portion 131) for interfacing with and installation by one or more tools or instruments.

The arrangement of the housing 120 relative to the hexagonal portion 131 of the body 110 as shown in FIGS. 2 and 4, and as described previously may be implemented into various practices. In some aspects, various practices and procedures may be modified so as to control the orientation of the housing 120 and the legs 122 relative to the body 110 and the hexagonal portion 131 thereof. For example, with regard to manufacturing and/or assembly of the concealed sprinkler assembly 100, the body 110 may be manipulated such that the housing 120 is coupled with the apertures 123 having a footprint substantially parallel that of the pair of flats 132 of the hexagonal portion. Accordingly, such practices may be implemented into work instructions or other methods in the manufacturing and assembly process done by both workers and automated equipment or systems. In some aspects, systems or equipment may be configured to position the body 110 and the housing 120 according to the arrangement shown in FIGS. 2 and 4. Additionally, the housing 120 and the body 110 may be configured as shown in FIG. 2 for the introduction of the guide pins 144 and the deflector 142, which are shown as part of the concealed sprinkler assembly of FIG. 4. In some aspects, the assembly of the guide pins 144 and the deflector 142 with the housing 120 and the body 110 may require the body 110 and the housing 120 to be arranged as shown in FIGS. 2 and 4.

Implementation of various processes, procedures, and methods to control the orientation of the housing 120 and the legs 122 relative to the body 110 and the hexagonal portion 131 thereof may include various strategies. For example, similar to shown in the example of FIG. 2, reference lines may be added to documents and/or drawings in order to indicate proper placement. With regard to production/manufacturing and assembly, reference lines such as those of FIG. 2 may be implemented with regard to templates and assembly drawings. Fixtures and other manufacturing equipment may also be developed in order to accommodate the desired orientation of the housing 120 relative to the body 110. For example, components configured to secure the body and/or housing during production and/or assembly may have geometries that correspond to or complement that of the body 110 and the hexagonal portion 131 thereof.

Figure 5:
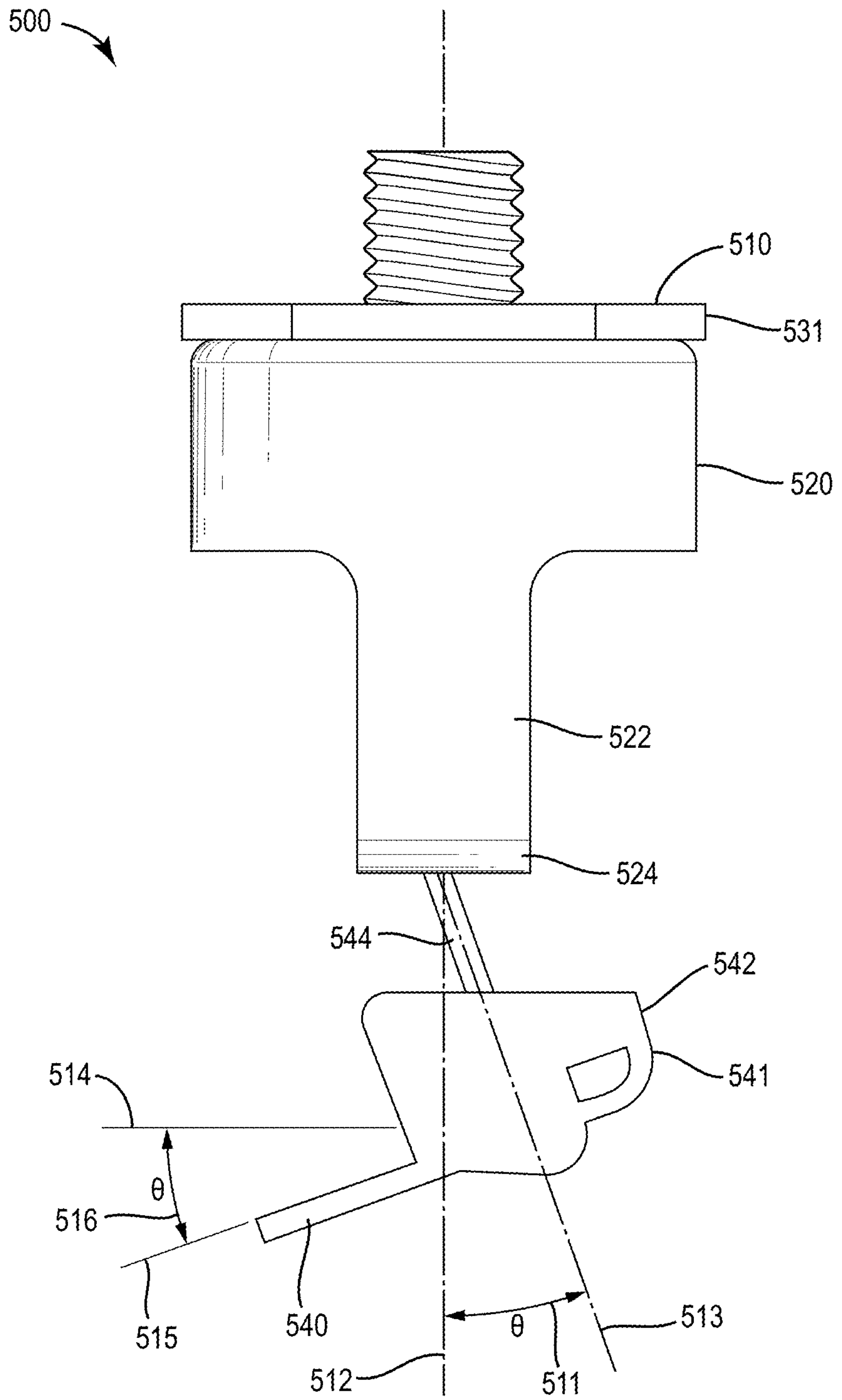
FIG. 5 is a schematic diagram of an alternate window sprinkler assembly, according to an example implementation.
Figure 6:
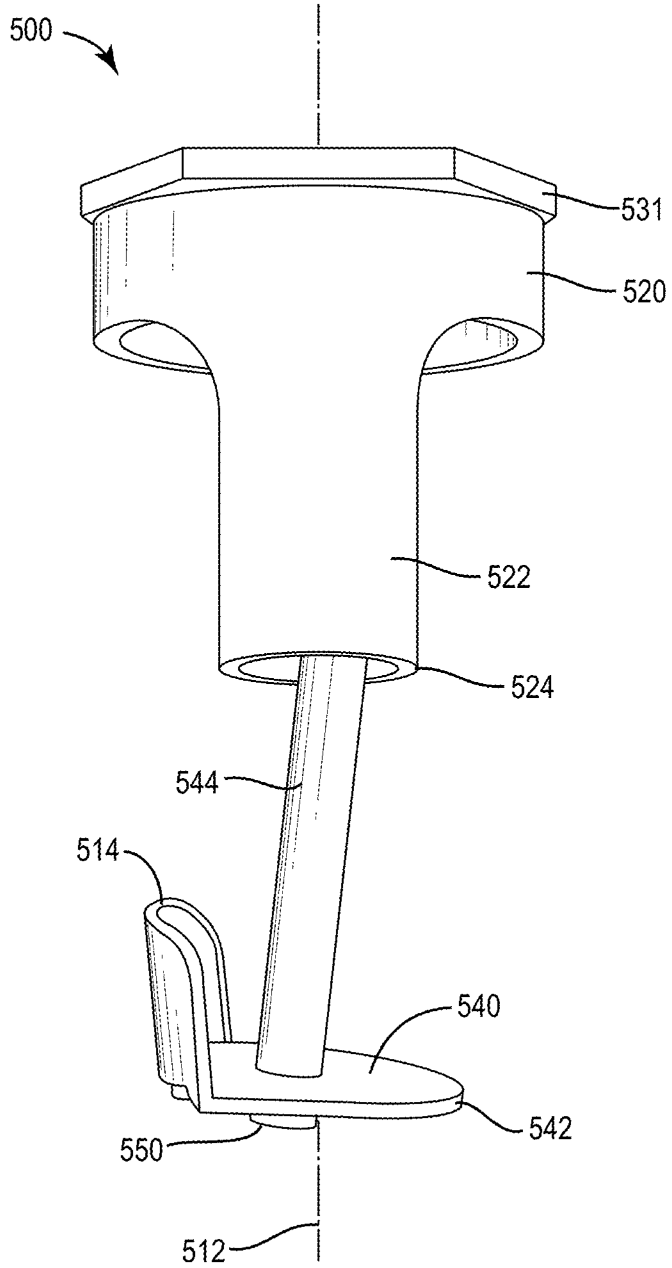
FIG. 6 is a perspective view of the window sprinkler assembly of FIG. 5, according to an example implementation.

Referring now to FIGS. 5-6, an alternate concealed sprinkler assembly 500 is shown. The concealed sprinkler assembly 500 may be the same as and/or similar to the concealed sprinkler assembly 100 as shown in FIGS. 1-4. In some aspects, the concealed sprinkler assembly 500 may be installed within a recess of a wall, ceiling, or other surface such that at least a portion of the concealed sprinkler assembly 500 is concealed within a recess of said surface. The concealed sprinkler assembly 500 may be activated upon the displacement of a cover of the recess housing the concealed sprinkler assembly 500. Similar to the concealed sprinkler assembly 100 as shown in FIGS. 1-4, the concealed sprinkler assembly 500 includes components configured to extend from the recess upon activation of the concealed sprinkler assembly 500, with such components including one or more guide pins and a deflector, according to one aspect. In some aspects, the concealed sprinkler assembly 500 may be installed in a recess of a wall or ceiling, with said recess being approximately 4 inches deep. Additionally, when installed within a ceiling such that the concealed sprinkler assembly 500 may provide fire exposure protection for a window and/or wall the concealed sprinkler assembly 500 has an approximate installation range of up to 12 inches (e.g., 6-12 inches) as measured from the window to a center-point of the concealed sprinkler assembly 500 (e.g., a vertical axis 512 as shown in the example of FIG. 5).

The concealed sprinkler assembly 500 includes a body 510, which may be similar to the body 110 as shown and described previously. The body 510 may be configured to couple with a fluid supply line such that a fluid may be provided to the concealed sprinkler assembly 500 and ultimately dispersed over an area to provide fire exposure protection. The body 510 may have a cylindrical central portion centered on the vertical axis 512, with said cylindrical portion configured to provide fluid communication between an interface of the body 510 with a fluid supply line and other components of the concealed sprinkler assembly 500. Additionally, the body 510 includes a hexagonal portion 531, with the hexagonal portion arranged on a lower portion of the body 510 (e.g., a portion of the body 510 opposite the interface between the body 510 and a fluid supply line). The hexagonal portion 531 may be configured the same as and/or similarly to the hexagonal portion 131 of the body 110 as shown in FIGS. 1-4. For example, manufacturing, assembling, and installing (as well as other processes associated with the concealed sprinkler assembly 500 may incorporate equipment and/or tools configured to interface with the hexagonal portion 531 of the body 510. In some aspects, the hexagonal portion 531 may be secured by one or more tools in order to assemble various components of the concealed sprinkler assembly 500. The concealed sprinkler assembly 500 may also be manipulated by tools or equipment contacting or interfacing with the hexagonal portion 531 in order to be properly installed.

The body 510 is coupled to a housing 520, with the housing 520 coupled to a lower portion of the body 510 adjacent the hexagonal portion 531. In some aspects, a portion of the body 510 may be configured to be received by a central portion of the housing 520, for example one or more components of a sealing assembly such as the sealing assembly 130 as shown as described in FIGS. 1-4. Accordingly, the coupling of the body 510 with the housing 520 is configured to provide fluid communication therethrough. For example, the arrangement of the housing 520 relative to the body 510 may be configured to permit the flow of a fluid from a fluid supply line through the body 510 and into a central portion of the housing 520. At least a portion of the housing 520 may have a substantially cylindrical geometry, with the housing 520 centered on the vertical axis 512.

The housing 520 is shown to include a pair of legs 522 extending from an upper portion of the housing 520 (e.g., the portion of the body coupled to the body 510), with each of the legs 522 having a foot 524 on a distal end thereof. The legs 522 are configured substantially opposite the housing 520 from one another (e.g., 180° opposite the cylindrical geometry of the housing 520), with the feet 524 extending toward the vertical axis 512. The feet 524 each include an aperture configured in a central portion of each foot 524 (not shown), with the apertures of the feet 524 configured the same as or similar to the apertures 123 as shown and described previously with reference to FIGS. 1-4. In some aspects, the feet 524 may be loosely coupled to the legs 522, while in other aspects the feet 524 may be distal portions of the legs 522. The apertures of the feet 524 are each configured to accommodate a guide pin 544, with each of the guide pins 544 moveable within the apertures 523. The apertures 523 are sized such that the guide pins 544 may move vertically in a direction parallel to the vertical axis 512. In some aspects, the guide pins 544 may be configured within the apertures 523 at an angle such that the extended position of the concealed sprinkler assembly 500 includes the guide pins 544 disposed such that the guide pins 544 do not have a substantially parallel orientation relative to the vertical axis 512. Additionally, the apertures 523 are sized such that the guide pins 544 may be manipulated laterally (e.g., away from parallel with the vertical axis 512) while remaining within the apertures 523. For example, the guide pins 544 may be sized such that, in an extended state (e.g., a deployed position), the guide pins 544 may be directed to an orientation that is not parallel with the vertical axis 512.

Similar to the concealed sprinkler assembly of FIGS. 1-4, the concealed sprinkler assembly 500 has both an inactivated (not shown) and deployed position. The inactivated position may be the same as and/or similar to that of the concealed sprinkler assembly 100 as shown in FIG. 3, with the guide pins 544 arranged within the housing 520 and a sealing assembly not permitting the flow of fluid from a fluid supply line. The concealed sprinkler assembly 500 may be deployed upon activation (e.g., displacement of a cover of the recess) in a manner the same as or similar to that of the concealed sprinkler assembly 100. For example, following deployment of a deflector 542 below the recess, a sealing assembly or other mechanism may, upon detection of fire or circumstances indicative of fire (or any other activating events) permit flow of a fluid from a fluid supply line to contact the deflector 542 of the concealed sprinkler assembly 500. However, in some aspects, the deployment of the deflector 542 and the guide pins 544 below the recess may be driven by a flow of fluid permitted following the decoupling of a sealing assembly. The deflector 542 may be similar to the deflector 142 as shown and described with reference to FIGS. 3-4, or may have alternate geometries. The deflector 542 is coupled to each of the guide pins 544. In some aspects, the deflector 542 may be coupled to a distal end of the guide pins 544 adjacent a head 550, as shown in the deployed position in FIG. 6. In some aspects, however, the deflector 542 may be coupled to the guide pins 544 such that the deflector 542 may be translated along the guide pins, with the range of motion of the deflector 542 defined by the head 550 and the feet 524 of the housing 520.

In activating the concealed sprinkler assembly 500, a cover of the recess housing the concealed sprinkler assembly 500 is displaced and the deflector 542 and the guide pins 544 deploy to extend from the recess below the concealed sprinkler assembly 500. Upon decoupling of a sealing assembly (e.g., solder or a heat link melting as a result of heat from a fire), a fluid is permitted to flow and subsequently contact the deflector 542 while the deflector 542 is in the deployed position (e.g., extending below the housing 520) and is dispersed and deflected. The dispersal pattern of the fluid from the deflector 542 is influenced by the geometry of the deflector 542, which includes a back wall 541 as well as a top surface 540. In some aspects, the deflector 542 may include additional components or modifications to the geometry of the top surface 540 and/or back wall 541. For example, the deflector 542 may include one or more downward angled portions and/or bends configured to direct the flow of fluid in a desired direction. Accordingly, the guide pins 544 move within the apertures 523 to facilitate the movement of the deflector 542. The deployed position is reached when a proximal portion of the guide pins 544 (not shown) contacts the feet 524, with said proximal portion of the guide pins 544 having a circumference greater than that of the apertures 523. The proximal portion of the guide pins 544 contacts the feet 524 and defines the range of motion of the guide pins 544 and the deflector 542 in the deployed position.

Once the deflector 542 reaches the deployed position as shown in FIGS. 5-6, the deflector may be manipulated such that the guide pins 544 are no longer parallel with the vertical axis 512. Such manipulation of the deflector 542 and the guide pins 544 may be driven by fluid flow. In some aspects, the guide pins 544 and/or the deflector 542 may be structured so as to facilitate the guide pins 544 assuming a position no longer parallel with the vertical axis 512, for example a geometry of the guide pins 544 and/or a structure or weighted portion of the deflector 542. Accordingly, in such a position the top surface 540 of the deflector 542 may be manipulated such that the top surface 540 constitutes a plane that is no longer substantially parallel with a horizontal axis 514, as shown in FIG. 5. As fluid contacts the deflector 542 in the deployed position of FIGS. 5-6, the guide pins 544 and deflector 542 may be manipulated such that the guide pins form a first angle 511 with the vertical axis 512, the first angle 51 indicating the deviation of the guide pins 544 from the vertical axis 512. Similarly, the manipulation of the deflector 542 may include the formation of a second angle 516 with the horizontal axis 514, the second angle 516 defined by the horizontal axis 514 and the plane defined by the top surface 540 of the deflector 542. The second angle 516 may, in some aspects, measure within a range (e.g., between 1° and 15°, or in some aspects may measure within a greater range). In some aspects, such as those in which the deflector 542 is rigidly coupled to the guide pins 544, the first angle 511 may be substantially equal in measure to the second angle 516. For example, if the second angle 516 measures 10°, the first angle 511 may measure approximately 10°. However, in some aspects in which the deflector 542 is not rigidly coupled to the guide pins 544, the first angle 511 and the second angle 516 may not be equal in measure. For example, if the second angle 516 measures 10°, the first angle 511 may have an approximate measure of 5° or 15°.

As shown in FIGS. 5-6, the deployed position of the concealed sprinkler assembly 500 includes the deflector 542 and the guide pins 544 extending from the housing 520 such that the angles 511 and 516 (shown in FIG. 5) are formed. Fluid contacting the top surface 540 of the deflector 542 may dispersed in a pattern other than that from which fluid would be dispersed if the guide pins 544 and deflector 542 were arranged such that the first angle 511 and the second angle 516 were not formed. For example, the pattern in which fluid may be dispersed from the deflector 542 when the top surface 540 forms a plane that is substantially parallel with the horizontal axis and the guide pins 544 are substantially parallel with the vertical axis 512 may not provide sufficient coverage for specific areas (e.g., a window or portion of a wall). However, the pattern in which the fluid may be dispersed from the deflector when the second angle 516 is formed by the top surface 540 and the horizontal axis 514 and the first angle 511 is formed by the guide pins 544 and the vertical axis 512 may provide sufficient coverage for specific areas (e.g. a window or portion of a wall). For example, a downward dispersion angle (e.g. second angle 516) and resulting spray pattern for the fluid may be beneficial if the ceiling of an area is not flush with the top of the glass of a window. In another example, if the ceiling of an area is flush with the top of the glass of a window than a horizontal dispersion angle (e.g., second angle 516) and resulting spray pattern for the fluid may be beneficial.

Figure 7:
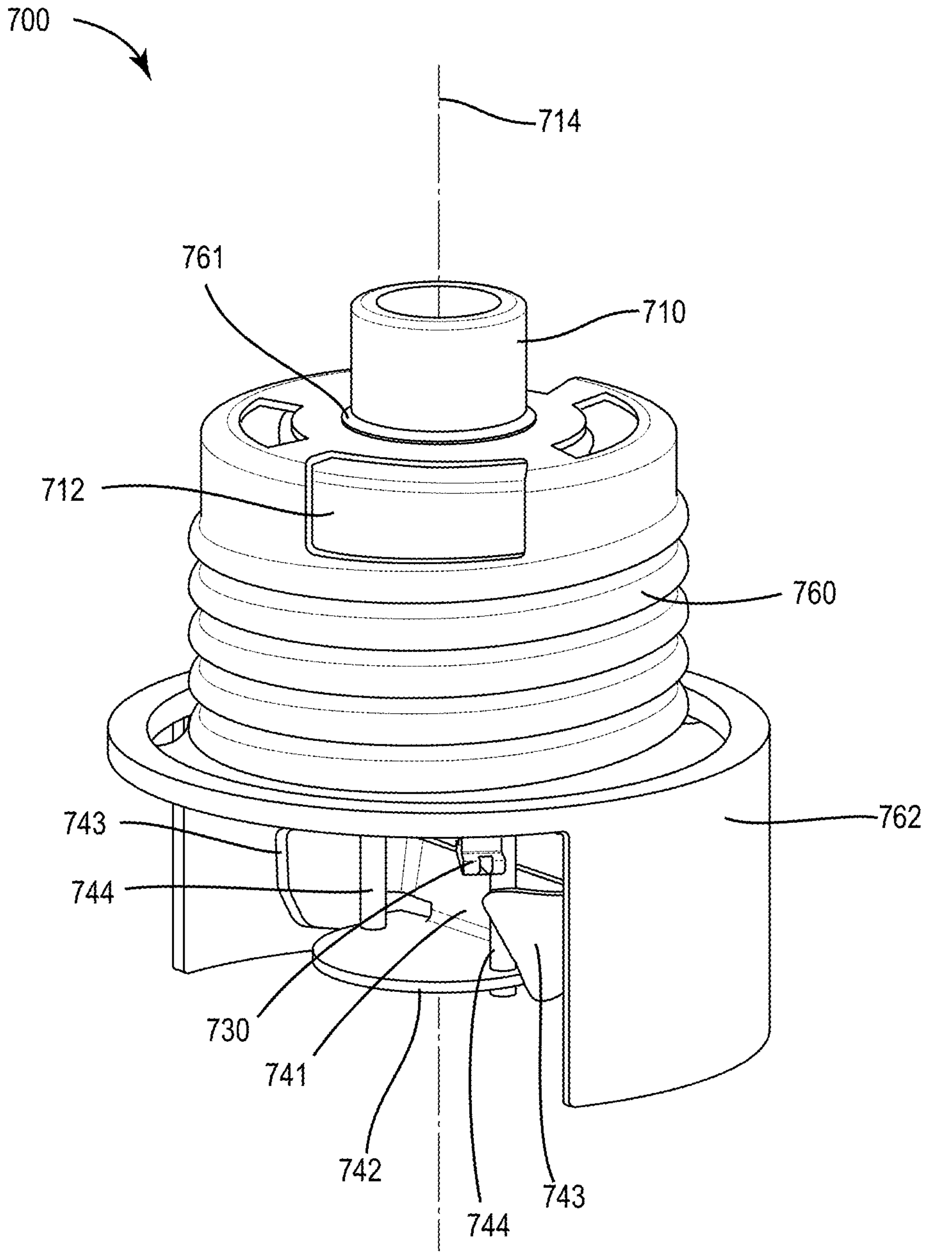
FIG. 7 is a perspective view of an alternate window sprinkler assembly, according to an example implementation.

Referring now to FIG. 7, a concealed sprinkler assembly 700 is shown. The concealed sprinkler assembly 700 may be installed and positioned within a recess of a wall or ceiling similarly to the concealed sprinkler assembly 100 and the concealed sprinkler assembly 500. The concealed sprinkler assembly may include one or more components the same as and/or similar to those of the concealed sprinkler assembly 100 and the concealed sprinkler assembly 500 as shown and described with reference to FIGS. 1-4 and FIGS. 5-6, respectively. The concealed sprinkler assembly 700 is shown to include a body 710, a housing 712, a sealing assembly 730, a deflector 742 and a pair of guide pins 744, one or more of which may be the same as and/or similar to the corresponding components of the concealed sprinkler assembly 100 and the concealed sprinkler assembly 500. Similar to the concealed sprinkler assemblies shown and described previously, the concealed sprinkler assembly 700 can be arranged in both inactivated and activated positions corresponding to both retracted and deployed positions of the deflector 742, respectively. For example, in the inactivated position the deflector 742 is retracted and the guide pins 744 may be arranged substantially within the housing 712 and, upon activation (and following the displacement of the cover of the recess housing the concealed sprinkler assembly 700) the deflector 742 and the guide pins 744 may deploy to extend below the housing 712 such that a fluid (supplied from a fluid supply line) may contact the deflector 742 and be dispersed over a desired window and/or wall. However, in some aspects, the deployment of the deflector 742 and the guide pins 744 below the recess may be driven by a flow of fluid permitted following the decoupling of the sealing assembly 730. The concealed sprinkler assembly 700 may also perform similar functions as the aforementioned concealed sprinkler assemblies in that the concealed sprinkler assembly 700 may be configured to provide fire exposure protection to a window and/or wall. Manufacturing, assembling, and installing the concealed sprinkler assembly 700 may include processes, methods, and/or tools that are implemented in accordance with the geometry of the concealed sprinkler assembly 700 and components thereof. For example, although not shown, the body 710 may include a hexagonal portion similar to that of the concealed sprinkler assembly 500 and the concealed sprinkler assembly 100 that is configured to interface with various equipment and/or tools.

The concealed sprinkler assembly 700 is shown to include an enclosure 761. The enclosure 761 is shown to include a threaded portion on an exterior surface thereof, and in some aspects may be implemented in the installation of the concealed sprinkler assembly 700 within a recess. Additionally, the enclosure 761 is shown to enclose at least a portion of the body 710 and the housing 712, as shown in FIG. 7. The housing 712 is shown to receive at least a portion of the body 710 (which may include at least a portion of the sealing assembly 730) similar to the configuration and arrangement of the housing and body components of the concealed sprinkler assembly 100 and the concealed sprinkler assembly 500. In some aspects, portions of the enclosure 761 may have a geometry configured to interface with the geometries of the body 710 and the housing 712. For example, as shown in the example of FIG. 7, the enclosure 761 is shown to include an opening having a substantially cylindrical geometry which is configured to receive a portion of the body 710. In some aspects, the portion of the body 710 protruding from the enclosure 761 may be configured to couple to a fluid supply line such that, under some conditions, a fluid may be permitted to flow through the concealed sprinkler assembly 700 such that the fluid contacts the deflector 742 and is subsequently dispersed over a desired window and/or wall.

The housing 712 may include one or more components the same as and/or similar to the housing of the concealed sprinkler assemblies as shown and described previously. For example, the housing 712 may include legs, feet, and apertures disposed within the feet to accommodate the guide pins 744. Additionally, the guide pins 744 may include a proximal portion having a geometry with a circumference greater than that of the apertures, as well as a head disposed on a distal end of the guide pins 744 similarly having a geometry with a circumference greater than that of any apertures disposed within the deflector 742. The guide pins 744 are shown to be coupled to the deflector 742, and may be loosely (e.g., the deflector may be moved along the guide pins 744) or rigidly (fixed at a distal portion of the guide pins 744) coupled thereto. The deflector 742 is shown to include a pair of arms 743 extending from a back wall 741. The arms 743 may be configured to provide a dispersal pattern such that fluid contacts the deflector 742 and is dispersed over a desired window and/or wall. In some aspects, the deflector 742, the back wall 741, and the arms 743 may have alternate geometries configured to disperse fluid over various windows and/or walls after said fluid contacts the deflector. The deflector 742 may also be configured as shown and described with respect to the concealed sprinkler assembly 500 and the concealed sprinkler assembly 100, according to some aspects.

In some aspects, concealed sprinklers configured to provide fire exposure protection for a window and/or wall such as the concealed sprinkler assembly 700 require a baffle if spaced within six feet of other sprinklers (e.g., concealed sprinklers). Concealed sprinklers such as those shown and described previously may direct the flow of a fluid near other concealed sprinklers if implemented without a baffle, and may accordingly prevent other concealed sprinklers in near proximity from activating. Accordingly, it is critical that fluid directed by concealed sprinklers only reach the desired window and/or wall so as to ensure concealed sprinklers in near proximity activate under proper circumstances and any such circumstances are not incorrectly influenced by other concealed sprinklers. Such baffles typically extend from the window and/or wall to a rear portion of the deflector (e.g., the back wall 741 of the deflector 742). Additionally, such baffles also extend from an upper portion of the window and/or wall for which fire exposure protection is provided to a lower portion thereof, and commonly obstruct view of said window and/or wall. The concealed sprinkler assembly 700 is shown to include a baffle 762. The baffle 762 is configured to eliminate the need for such baffles required for concealed sprinklers as described previously without obstructing any view of the window and/or wall for which fire exposure protection is provided.

The baffle 762 may comprise plastic, metal or other rigid materials, according to some aspects. The baffle 762 is shown to have a substantially cylindrical geometry, and is further shown to receive at least a portion of the housing 712 (e.g., the legs of the housing 712), as well as the guide pins 744 and the deflector 742. Additionally, with regard to the obstruction of views common to traditional baffles of concealed sprinklers such as the concealed sprinkler assembly 700, the baffle 762 does not contact the window and/or wall for which fire exposure protection is provided, nor does the baffle 762 obstruct views of the window and/or wall. The baffle 762 is shown to be coupled to other components of the concealed sprinkler assembly 700, which may include the body 710, the housing 712, and the enclosure 761. Additionally, the baffle 762 is configured to at least partially surround the deflector 742 and the guide pins 744 when the concealed sprinkler assembly 700 is in the deployed position, as shown in FIG. 7. For example, in some aspects the baffle 762 may surround the deflector 742 and the guide pins 744 by approximately 180°. However, in other aspects the baffle 762 may surround the deflector 742 and the guide pins 744 to a greater or lesser degree, for example 90° or 270°. Different concealed sprinkler assemblies such as the concealed sprinkler assembly 700 may require baffles surrounding the deflector 742 to different degrees, with the portion of the deflector 742 surrounded by the baffle 762 corresponding to the desired coverage area and direction of the fluid dispersal. The portion of the baffle 762 surrounding the deflector 742 is configured to prevent spray distribution into undesired areas (e.g., other concealed sprinklers). The portion of the baffle 762 not surrounding the deflector 742 is configured to permit spray distribution to a desired window and/or wall, such as the window and/or wall for which fire exposure protection is provided. Additionally, in some aspects the baffle 762 may include one or more vents configured to permit airflow but restrict fluid flow, or vice-versa. Additionally, in some aspects the baffle 762 may be configured to extend from the ceiling of an area to the bottom of the deflector 742 when in the deployed position, thus preventing fluid from being dispersed in a direction parallel to a desired window and contacting adjacent sprinklers (which could cause solder failures).

The baffle 762 is configured to prevent fluid supplied by a fluid supply line and contacting the deflector 742 in the extended position form spraying out parallel to the window and/or wall for which fire exposure protection is provided. Additionally, the baffle 762 is configured to prevent said fluid from spraying onto adjacent sprinklers (some or all of which may be concealed sprinklers), as errant fluid spray may cause solder failures and may ultimately prevent components from adjacent sprinklers from functioning properly. For example, if an adjacent sprinkler were the same as or similar to that of the concealed sprinkler assemblies shown and described previously, the sealing assembly (e.g., sealing assembly 130) may include solder configured to melt when said solder reaches a specific temperature. The melting of the solder may permit flow of a fluid from a fluid supply line to a deflector (e.g., deflector 742) with the fluid then dispersed to provide fire exposure protection for a desired window and/or wall. However, errant fluid spray from the concealed sprinkler assembly 700 (e.g., water impingement) may prevent the solder of the adjacent sprinkler from reaching a melting point, and thus prevent the adjacent sprinkler from activating and providing necessary fire exposure protection by dispersing fluid over the desired window and/or wall.

As utilized herein, the terms "approximately," "about," "substantially", and similar terms are intended to include any given ranges or numbers +/−10%. These terms include insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The construction and arrangement of the fitting assembly as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A concealed sprinkler assembly, comprising:

a body forming an opening around an axis;

a seal coupled with the opening;

a pair of legs coupled with the body, the pair of legs disposed about the axis, each leg of the pair of legs comprising an aperture;

a pair of guide pins, each guide pin of the pair of guide pins coupled with a respective aperture of the pair of legs, each guide pin of the pair of guide pins comprising a head greater in size than the respective aperture to limit movement of the guide pin relative to the aperture; and a deflector, comprising:

a first surface coupled with the pair of guide pins to move with the pair of guide pins, the first surface forming a front and a back, the first surface facing the opening to receive fluid outputted from the opening;

a back wall coupled with the back of the first surface at an angle to the first surface, the back wall comprising a straight edge opposite where the back wall is coupled with the first surface; and a first arm on a first side of the back wall and a second arm on a second side of the back wall, the first arm and the second arm each comprising a respective end that is outward from the axis relative to the pair of guide pins, the respective end of the first arm and of the second arm each extend past the back of the first surface towards the front of the first surface, the first arm and the second arm each angled relative to the back wall.

2. The concealed sprinkler assembly of claim 1, comprising:

the first arm and the second arm each comprise a first portion and a second portion angled with respect to the first portion.

3. The concealed sprinkler assembly of claim 1, comprising:

an enclosure coupled with the body, the enclosure comprising a threaded portion on an exterior surface of the enclosure, the enclosure enclosing at least a portion of the body.

4. The concealed sprinkler assembly of claim 1, comprising:

the respective end of each of the first arm and the second arm is forward of the back wall relative to the axis.

5. The concealed sprinkler assembly of claim 1, comprising:

the first surface is flat between where the pair of guide pins are coupled with the first surface.

6. The concealed sprinkler assembly of claim 1, comprising:

the first arm and the second arm are contiguous with the back wall.

7. The concealed sprinkler assembly of claim 1, comprising:

the back wall is oriented to direct the fluid outputted from the opening towards at least one of a window or a wall.

8. The concealed sprinkler assembly of claim 1, comprising:

the pair of legs each comprise a foot forming the respective aperture, each foot is perpendicular to a corresponding leg of the pair of legs.

9. A sprinkler, comprising:

a body forming an opening around an axis;

a sealing assembly coupled with the opening to seal the opening;

a housing coupled with the body, the housing comprising a pair of legs disposed about the axis, each leg of the pair of legs comprising an aperture;

an enclosure coupled with the body and disposed at least partially around the body and the housing;

a pair of guide pins, each guide pin of the pair of guide pins coupled with a respective aperture of the pair of legs, each aperture sized to limit movement of the guide pin; and a deflector, comprising:

a first surface coupled with the pair of guide pins to move with the pair of guide pins, the first surface forming a front and a back, the first surface facing the opening to receive fluid outputted from the opening responsive to the sealing assembly decoupling from the opening to allow the fluid to flow from the opening;

a back wall coupled with the back of the first surface; and a first arm on a first side of the back wall and a second arm on a second side of the back wall, the first arm and the second arm each comprising a respective end that is outward from the axis relative to the pair of guide pins, the respective end of the first arm and of the second arm each extend past the back of the first surface towards the front of the first surface, the first arm and the second arm each angled relative to the back wall.

10. The sprinkler of claim 9, comprising:

the back wall is disposed at an angle to the first surface, the back wall comprising a straight edge opposite where the back wall is coupled with the first surface.

11. The sprinkler of claim 9, comprising:

the enclosure comprises a threaded portion.

12. The sprinkler of claim 9, comprising:

the deflector has a first position and a second position further from the opening than the first position, the deflector to be driven by the fluid outputted from the opening from the first position to the second position.

13. The sprinkler of claim 9, comprising:

the first arm and the second arm each comprise a first portion and a second portion angled with respect to the first portion; and the respective end of each of the first arm and the second arm is forward of the back wall relative to the axis.

14. The sprinkler of claim 9, comprising:

the first surface is flat between where the pair of guide pins are coupled with the first surface.

15. The sprinkler of claim 9, comprising:

the back wall is oriented to direct the fluid outputted from the opening towards at least one of a window or a wall.

16. The sprinkler of claim 9, comprising:

the pair of legs each comprise a foot forming the respective aperture, each foot is perpendicular to a corresponding leg of the pair of legs.

17. A concealed sprinkler, comprising:

a body forming an opening around an axis;

a pair of legs disposed about the axis, each leg of the pair of legs comprising a foot perpendicular to the leg, the foot forming an aperture;

an enclosure coupled with the body and disposed at least partially around the body, the enclosure having a threaded portion on an exterior of the enclosure;

a pair of guide pins, each guide pin of the pair of guide pins coupled with the aperture of one leg of the pair of legs, each aperture sized to limit movement of the guide pin relative to the body; and a deflector, comprising:

a first surface coupled with the pair of guide pins to move with the pair of guide pins, the first surface facing the opening to receive fluid outputted from the opening, the first surface forming a front and a back;

a back wall coupled with the back of the first surface, the back wall angled relative to the first surface to direct the fluid outputted from the opening towards at least one of a window or a wall; and a first arm on a first side of the back wall and a second arm on a second side of the back wall, the first arm and the second arm each comprising a respective end that is outward from the axis relative to the pair of guide pins, the respective end of the first arm and of the second arm each extend past the back of the first surface towards the front of the first surface, the first arm and the second arm each angled relative to the back wall.

18. The concealed sprinkler of claim 17, comprising:

the back wall comprises straight edge opposite where the back wall is coupled with the first surface.

19. The concealed sprinkler of claim 17, comprising:

the first arm and the second arm each comprise a first portion and a second portion angled with respect to the first portion.

20. The concealed sprinkler of claim 17, comprising:

the respective end of each of the first arm and the second arm is forward of the back wall relative to the axis.

* * * * *